US006756585B2

United States Patent
Damaschke

(10) Patent No.: US 6,756,585 B2
(45) Date of Patent: Jun. 29, 2004

(54) PROCESS FOR MANUFACTURING A HOUSING FOR SENSOR ELEMENTS, SENSOR AND USE THEREOF

(75) Inventor: Gerhard Damaschke, Flörsheim (DE)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

(21) Appl. No.: 10/094,245

(22) Filed: Mar. 8, 2002

(65) Prior Publication Data

US 2002/0125417 A1 Sep. 12, 2002

(30) Foreign Application Priority Data

Mar. 9, 2001 (DE) .......................................... 101 11 657

(51) Int. Cl.$^7$ ............................ H01J 40/14; H01J 7/24; H01L 31/08; H01L 29/267
(52) U.S. Cl. ..................... 250/239; 250/238; 338/22 R; 338/15; 338/30; 257/81
(58) Field of Search ................................. 250/239, 238, 250/216, 214.1; 338/22 R, 30, 15; 257/80–84, 341–345

(56) References Cited

U.S. PATENT DOCUMENTS 4,437,084 A * 3/1984 Clayton, Jr.
5,811,798 A * 9/1998 Maurin et al.

FOREIGN PATENT DOCUMENTS

| DE | 196 21 000 C2 | * | 11/1997 |
| DE | 196 38 813 C1 | * | 3/1998 |
| DE | 197 57 006 A1 | * | 7/1999 |
| DE | 198 32 533 C1 | | 11/1999 |
| DE | 198 39 631 C1 | | 3/2000 |
| DE | 199 12 593 A1 | | 1/2001 |
| EP | 0 539 555 B1 | | 4/1996 |

* cited by examiner

*Primary Examiner*—David Porta
*Assistant Examiner*—David C. Meyer
(74) *Attorney, Agent, or Firm*—Akin Gump Strauss Hauer & Feld, L.L.P.

(57) ABSTRACT

For manufacturing a housing for sensor elements, a pliable material is introduced into the environment of the sensor element (2) by an injection molding process. In a first process step, the sensor element is injection-encapsulated by a soft plastic component (1), and in a second process step a hard plastic component (5) is applied thereon, which forms the outer housing for the sensor element (2). The sensor element (2) is provided with at least two connection leads (11), which are at least partially encapsulated by the soft plastic component (1). A sensor manufactured according to the process, especially a temperature sensor, is provided with a measuring resistor as a sensor element (2) on a substrate with an electrically conducting surface and the resistance layer situated thereon. The measuring resistor is encased by the soft plastic component (1), which in turn is encapsulated in a hard plastic component serving as a housing.

11 Claims, 3 Drawing Sheets

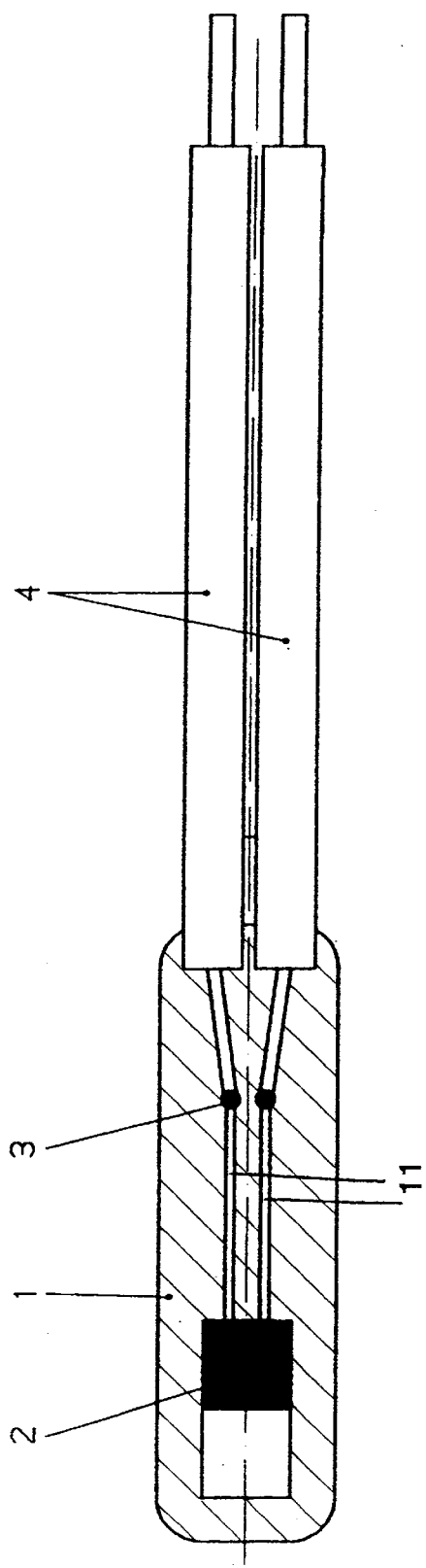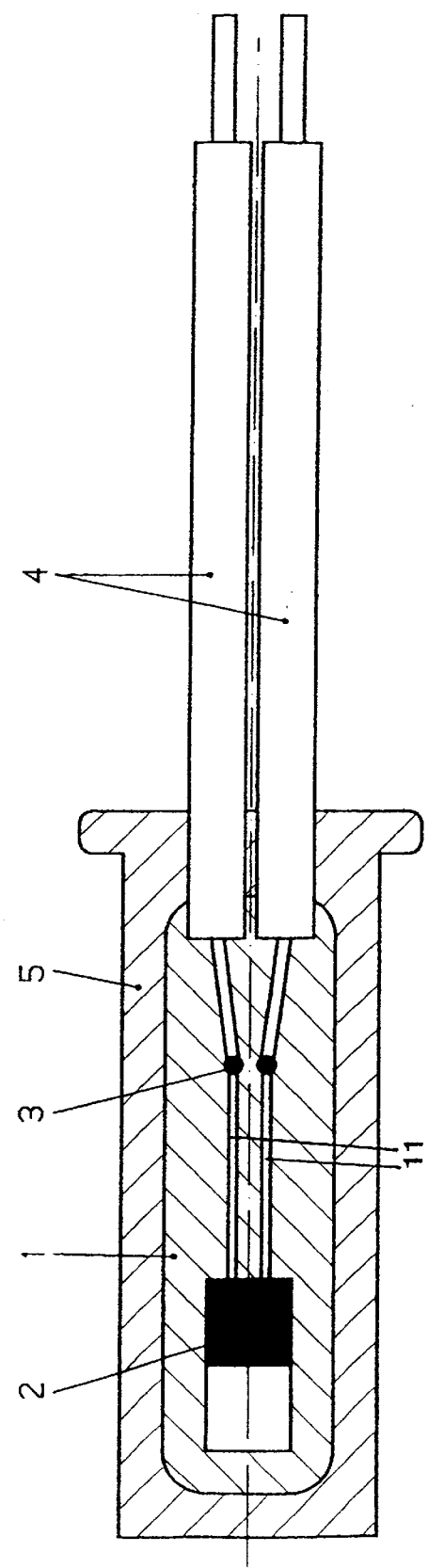

PROCESS FOR MANUFACTURING A HOUSING FOR SENSOR ELEMENTS, SENSOR AND USE THEREOF

BACKGROUND OF THE INVENTION

The invention is directed to a process for manufacturing a housing for sensor elements with at least one outer housing element comprising plastic material. The invention is also directed to a sensor and its use as a temperature sensor.

In the following, plastic components with pliable or rubber-like properties, for example, thermoplastic elastomers or elastics, or TPE, are designated as soft plastic components, while plastic components which no longer have practically any deformability after manufacture, for example, polyamide or PPS-are described as hard, optionally even as hardenable, plastic components or as hard material of a plastic injection encapsulation.

From German published patent application DE 197 57 006 A1, a process is known for manufacturing measurement value receivers having a sensor element and a housing comprising a plastic material, wherein a so-called "Molded Interconnected Device (MID)" manufacturing process is used. Here, in a first manufacturing step of the MID process, a carrier element filled with palladium is first injection molded. In a second operation, the areas of the carrier element on which no electrically conducting elements are to arise are coated with a plastic protective layer. In a third process step, the electrical connection leads are then galvanically applied on the non-encapsulated surface of the carrier element, whereby the conductor paths are formed. In a fourth operation, the sensor element and the associated measuring circuit are applied. The resulting mounted components in the area of the sensor element still covered with a plastic or ceramic top can be cemented or heat-caulked. Subsequently, in a fifth and final process step, the entire arrangement is injection-encapsulated with plastic. This involves a comparatively expensive manufacturing process.

Furthermore, from European patent EP 0 539 555 B1, a housing structure around an operating device is known wherein, as the operating device, for example, a semiconductor element, an element based on a semiconductor, a sensor element, a microactuator, or an electronic circuit comprising one or more integrated circuits comes into question. The housing forms at least one closed off hollow space, which surrounds the operating device either wholly or partially, whereby metal parts run through the walls of the housing and form wire connections to the operating device surrounded by the housing. The hollow space is thereby sealed off and filled with an electrically insulating fluid. The housing is made of a plastic molding compound, wherein the plastic molding compound is a thermoplastic, and at least parts of the walls surrounding the operating device are designed to be pliable, in order to accommodate expansion forces. For the housing structure, the surrounding housing around such an operating device is formed by two or more components. During assembly at least one hollow space results. This involves a comparatively complex construction, whose realization is associated with comparatively high costs.

Furthermore, from German patent DE 196 21 000 C2, a temperature sensor is known, which has a measuring resistor comprising a substrate with an electrically insulating surface and a resistance layer situated on it and surrounded by a casing of temperature-resistant plastic as well as an additional outer housing of plastic, through which the connection leads of the measuring resistor are passed. The casing serves as a primary housing which, together with the embedded measuring resistor in the form of a resistance layer, is surrounded by a plastic injection-encapsulation as an outer housing. Here the connection leads are passed outward through the plastic encapsulation, the measuring resistor is constructed as an SMD component and is sealed against its environment by means of the plastic casing. Consequently, at least two of the connection leads between the measuring resistor and the outer connection contacts are passed gas- and liquid-tight though the plastic casing and the plastic injection encapsulation, so that the sensor is also sealed off against the ambient atmosphere.

It has proven to be problematic that, upon solidification of the plastic injection encapsulation, the measuring resistor can be impaired in its accuracy due to shrinkage processes.

BRIEF SUMMARY OF THE INVENTION

An objective of the invention is to provide a process for the direct housing of sensors, particularly temperature sensors based on resistors, wherein a high accuracy of the sensor element is maintained. Furthermore, a sensor manufactured according to the processes should be provided.

The objective is accomplished in accordance with the invention in that the housing is manufactured in a two-component injection molding process, wherein in a first process step the sensor is injection-encapsulated by a soft plastic component and in a second process step, a second plastic component is applied, which forms the outer housing for the sensor element as a hard plastic component.

It proves to be particularly advantageous that, due to the soft component, no shrinkage processes affect the sensor element and thereby its accuracy. A further advantage is to be seen in that customer-specific solutions-for example special plugs-can be applied at the electrical connection of the sensor.

In a preferred embodiment of the process, the sensor element is provided with at least two connection leads, which are at least partially encapsulated by the soft plastic component. Advantageously, the connection leads of the sensor element, together with connection points for an external supply leads, are injection-encapsulated by the soft plastic component. In practice, in a first process step, the sensor element is encapsulated by an elastomer or an elastic.

The objective is accomplished with respect to device aspects for a sensor, especially a temperature sensor, having a sensor element which is enclosed by a housing having at least one plastic component, in that the sensor element is encased by a soft plastic component, which in turn is arranged in a plastic component serving as an outer housing, as an encapsulation made of a hard material.

The objective is further accomplished for a sensor, especially for a temperature sensor, having a measuring resistor as a sensor element on a substrate with an electrically insulating surface and a resistance layer situated on it, wherein the measuring resistor is enclosed by a housing made of hard plastic molding compound, in that the measuring resistor is encased by a soft plastic component, which in turn is arranged in a plastic component serving as an outer housing, as an encapsulation made of a hard material.

In a preferred embodiment of the sensor, the measuring resistor is connected via at least two connection leads to an evaluation circuit connectable from outside, wherein the connection leads are at least partially encased by the soft plastic component. Here, the connection leads are advantageously passed through the soft, as well as through the hardenable plastic component.

For customer-specific uses, at least one end of a connection lead is mechanically and electrically connected with one end of a plug.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1a is a plan view, partially in section, of a measuring resistor as sensor element, which is only injection-encapsulated by a soft plastic component (according to the first process step).

FIG. 1b is a plan view, partially in section, of a measuring resistor as sensor element, on which additionally a hard plastic component has been applied, which forms the outer housing for the sensor element (according to the second process step).

DETAILED DESCRIPTION OF THE INVENTION

Figure 2:
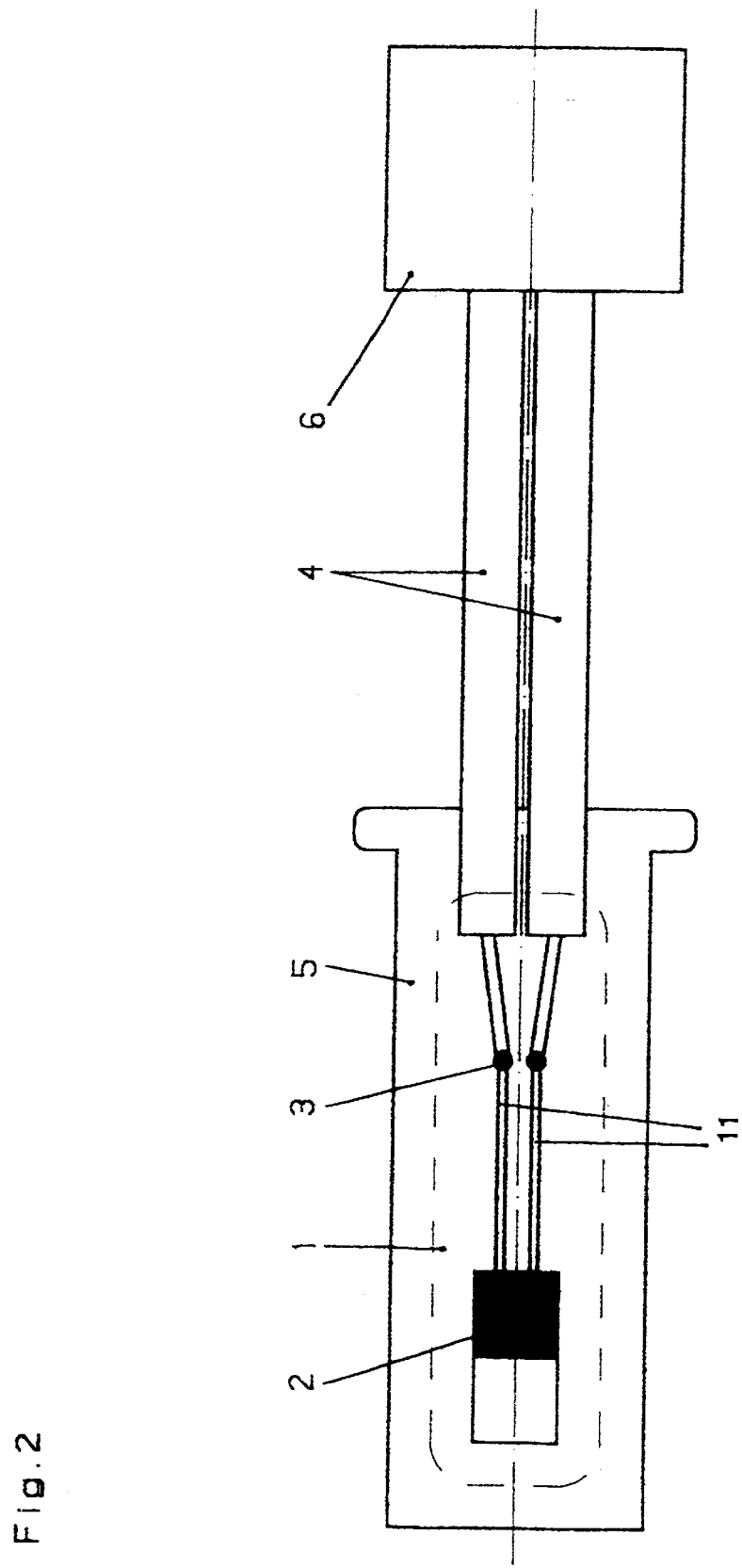
FIG. 2 is a plan view, with the soft plastic represented in dotted lines, of a similar embodiment as FIG. 1b, wherein here, however, an additional customer-specific plug system is arranged on the end of a supply lead.

In accordance with FIGS. 1a and 1b the direct housing of the sensor element, constructed as a measuring resistor 2, takes place in a two-component injection molding process, wherein in the first process step (FIG. 1a), a soft plastic component 1 is injected around the measuring resistor 2, and a connection point 3 connected with a supply lead 4 is connected with connection leads 11 to measuring resistor 2. In FIGS. 1a and 1b, the supply lead 4 is executed as a two-wire cable, but any other type of connection cable or individual wire is usable. The soft plastic component 1, serving as the casing of the measuring resistor is represented in longitudinal section.

According to FIG. 1a, each of measuring resistor 2, connecting point 3 and the end of supply lead 4 is encapsulated by the soft plastic component 1. On this soft plastic component 1, in accordance with FIG. 1b, an outer hard, optionally hardenable, component 5 is then injected on, which ensures a sufficiently hardened, temperature-resistant outer housing, so that the sensor is resistant even for temperatures up to a range of about 130 to 150° C.

As a material for the soft component 1, preferably a TPE (thermoplastic elastomer) is used, while the outer hard component 5 preferably comprises PA (polyamide) or PPS (polyphenylene sulfide).

The embodiment represented in FIG. 2 corresponds substantially to the arrangement shown in FIG. 1b, whereby here, however, at the end of supply lead 4, a customer-specific plug system 6 is applied, so that the complete sensor is incorporated as a rapidly interchangeable measuring element into a complete control or measuring system. Thus, for example, with the use of temperature sensors, a previously matched measuring resistor 2 is used, which can be integrated in a simple manner into a customer-specific evaluation or measurement device. It is, however, also possible to use another sensor, for example an NTC.

Figure 3:
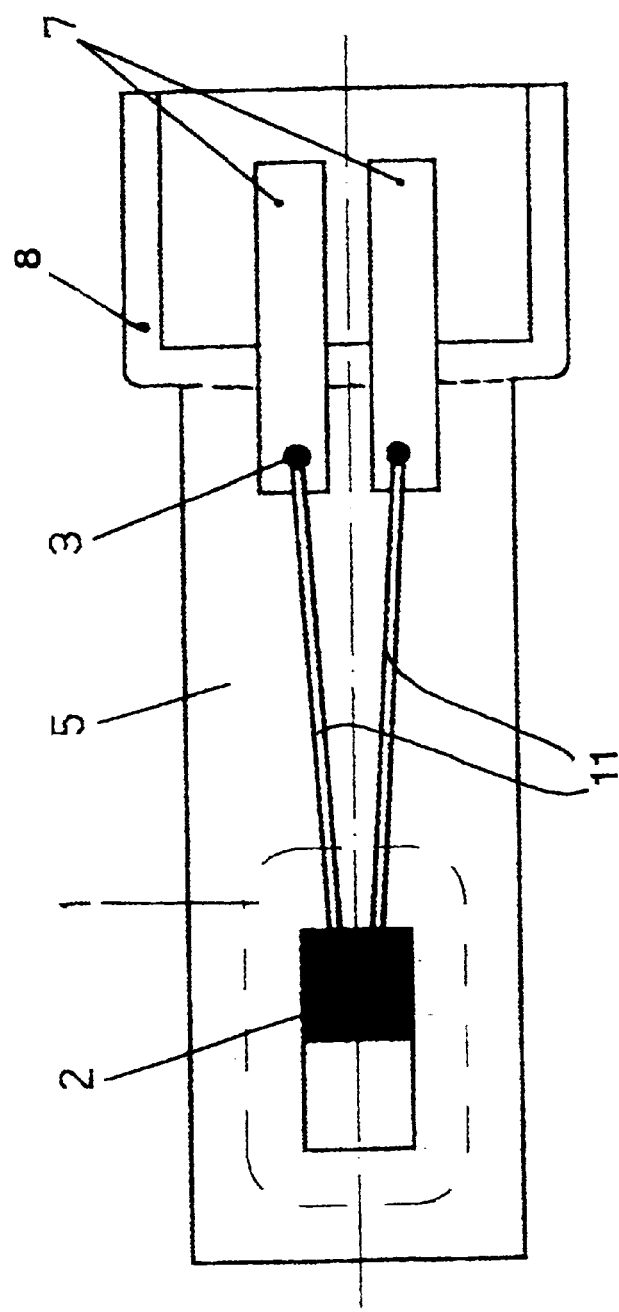
FIG. 3 is a plan view of a sensor as measuring resistor with connection leads, which are connected directly to connecting points with contact pins.

In accordance with FIG. 3, the measuring resistor 2 serving as a sensor element is enclosed in a relatively small volume of soft plastic component 1, which is here represented symbolically with dotted lines. The connection wires 11 of the measuring resistor 2 lead out of the plastic component 1 directly to connection points 3 on contact pins 7, which are constructed as part of a plug system 8. The hard plastic component forming the outer housing of the sensor element is designated with reference number 5.

Even here, it is a matter of a customer-specific embodiment which in practice, due to the plug system as an insert, practically rules out any possibilities for confusion. On the basis of the individual components of the embodiment in accordance with FIG. 3, such a sensor can also be provided by the customer with specific features, so that the sensor element is usable as a part of a complete measuring or control engineering facility or evaluation unit. Since the measuring resistor 2 is previously adjusted, a rapid change can take place here by the respective user in the event of a sensor failure, without particular special knowledge being necessary for the interchange.

It proves to be especially advantageous that it is possible to manufacture the sensor with a high degree of automation, whereby through variable inserts in an injection mold, cross section and length of the sensor can be optimized.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A process for manufacturing a housing for a sensor element with at least one outer housing comprising a plastic material, the process comprising a two-component injection molding process comprising a first process step of injection encapsulating the sensor element in a soft plastic component and a second process step of applying a second plastic component as a hard plastic component which forms the at least one outer housing for the sensor element wherein the sensor element comprises at least two connection leads, and wherein the at least two connection leads together with connection points for an external supply lead are encapsulated by the soft plastic component.

2. A process for manufacturing a housing for a sensor element with at least one outer housing comprising a plastic material, the process comprising a two-component injection molding process comprising a first process step of injection encapsulating the sensor element in a soft plastic component and a second process step of applying a second plastic component as a hard plastic component which forms the at least one outer housing for the sensor element, wherein in the first process step the sensor element is injection encapsulated with an elastomer or elastic material.

3. The process according to claim 2, comprising providing the sensor element with at least two connection leads which are at least partially encapsulated by the soft plastic component.

4. The process according to claim 2, wherein the connection leads of the sensor element together with connection points for an external supply lead are encapsulated by the soft plastic component.

5. A temperature sensor comprising a sensor element (2) surrounded by a housing having at least two plastic components, wherein the sensor element (2) is injection encapsulated by a soft plastic component (1) made of an elastomer or elastic material which is in turn injection encapsulated in a hard plastic component (5) serving as an outer housing.

6. A sensor comprising a measuring resistor (2) as a sensor element having a substrate with an electrically insulating surface and a resistor layer situated thereon, wherein the measuring resistor is injection encapsulated by a soft plastic component (1) made of an elastomer or elastic material, and wherein the soft plastic component is injection encapsulated in an outer housing of a hard plastic component (5).

7. The sensor according to claim 6, wherein the sensor element is connected via at least two connection leads (11) with an evaluation circuit connectable from outside, and wherein the connection leads are at least partially encased by the soft plastic component (1).

8. The sensor according to claim 7, wherein the connection leads (11) pass through the soft plastic component (1) and through the hard plastic component (5).

9. The sensor according to claim 7, wherein at least one end of a connection lead is connected mechanically and electrically with one end of a plug.

10. The sensor according to claim 6, which is a temperature sensor.

11. The process according to claim 1, wherein in the first process step the sensor element is injection encapsulated with an elastomer or elastic material.

* * * * *